Figure 1:
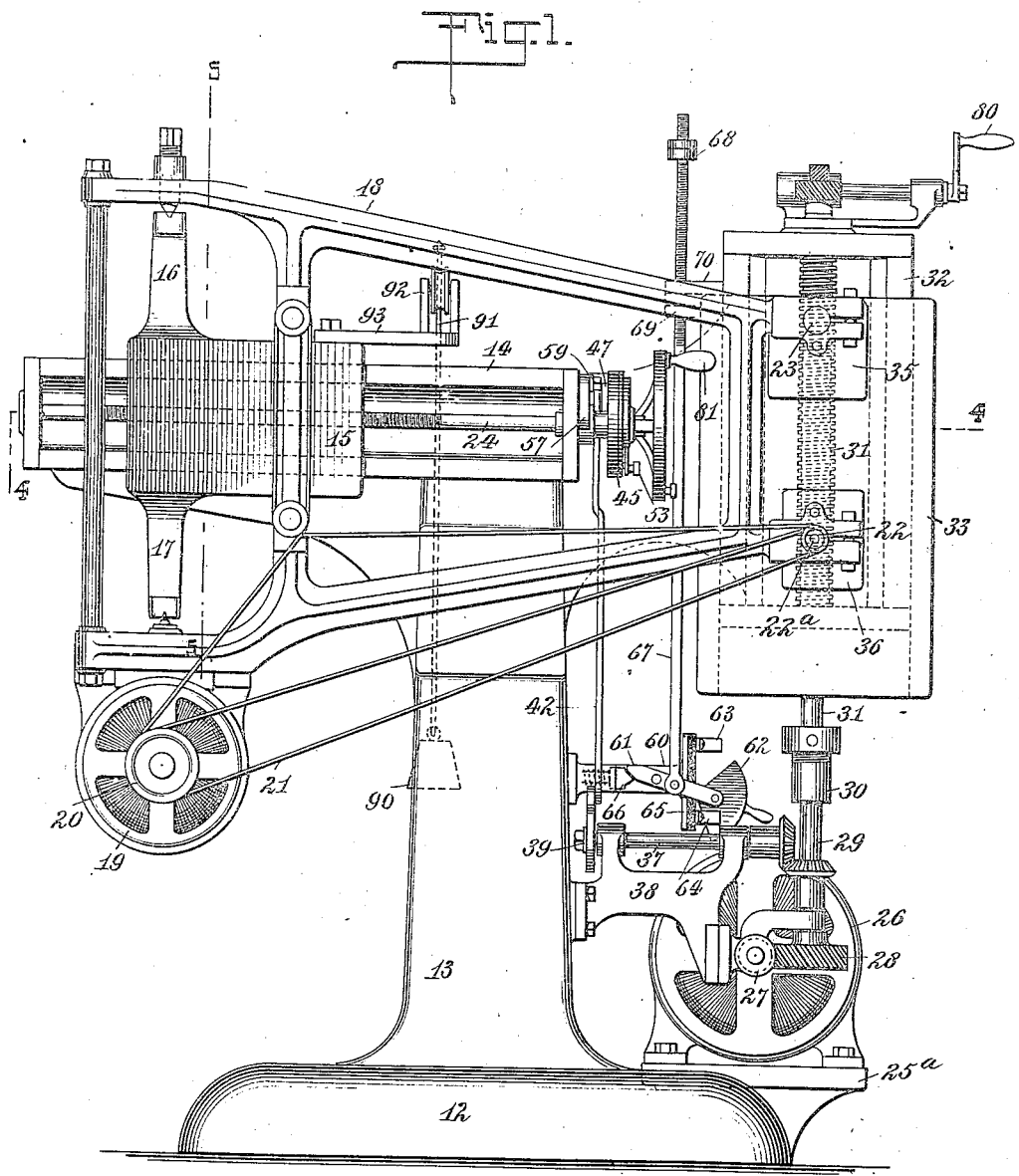

J. F. KELLER & W. A. WARMAN.
MACHINE FOR ENGRAVING OR SINKING DIES.
APPLICATION FILED AUG. 7, 1909.

956,769.

Patented May 3, 1910.

3 SHEETS—SHEET 1.

WITNESSES:
Parker Cook
W Stuart Roe

INVENTORS:
Joseph F. Keller and
William A. Warman
BY George Cook
ATTORNEY

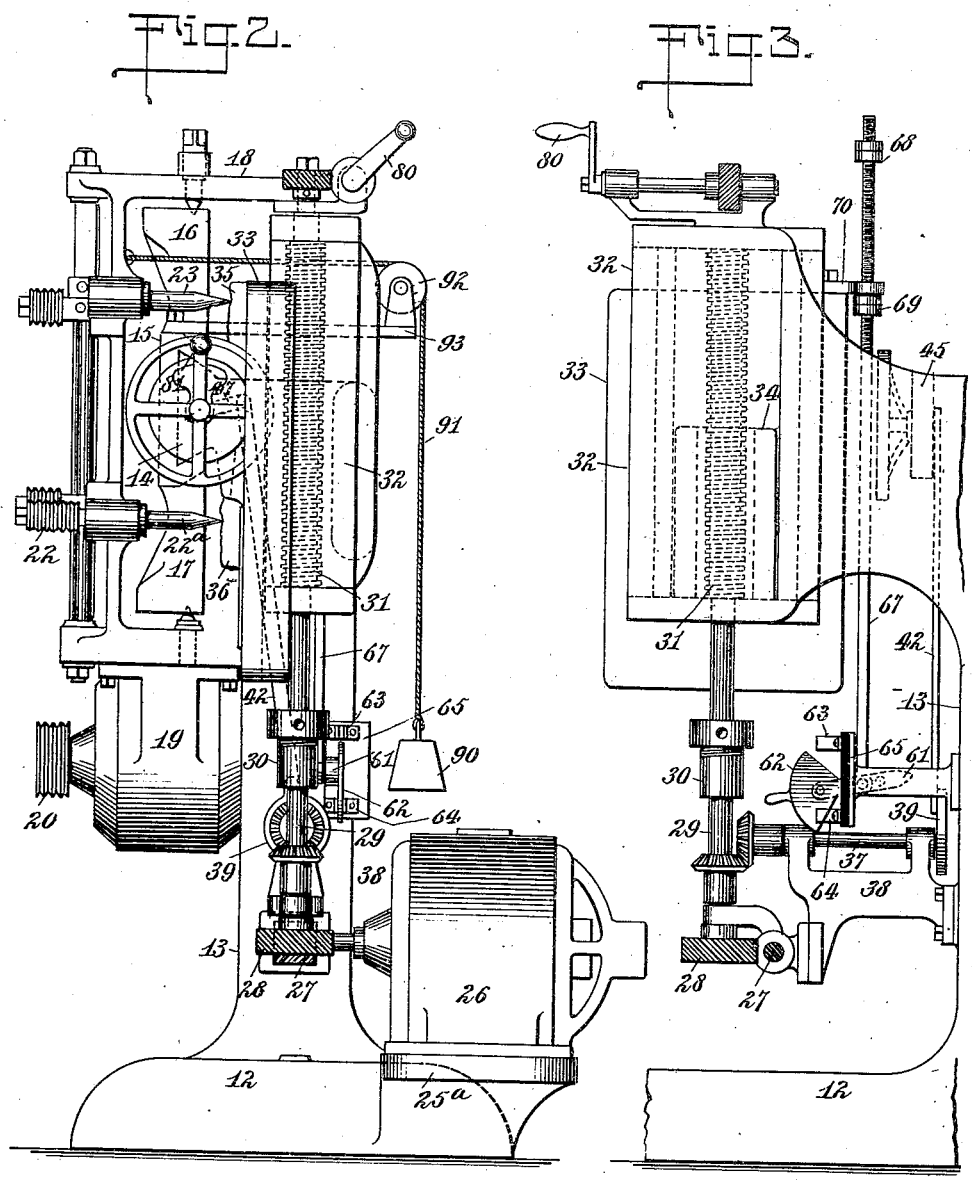

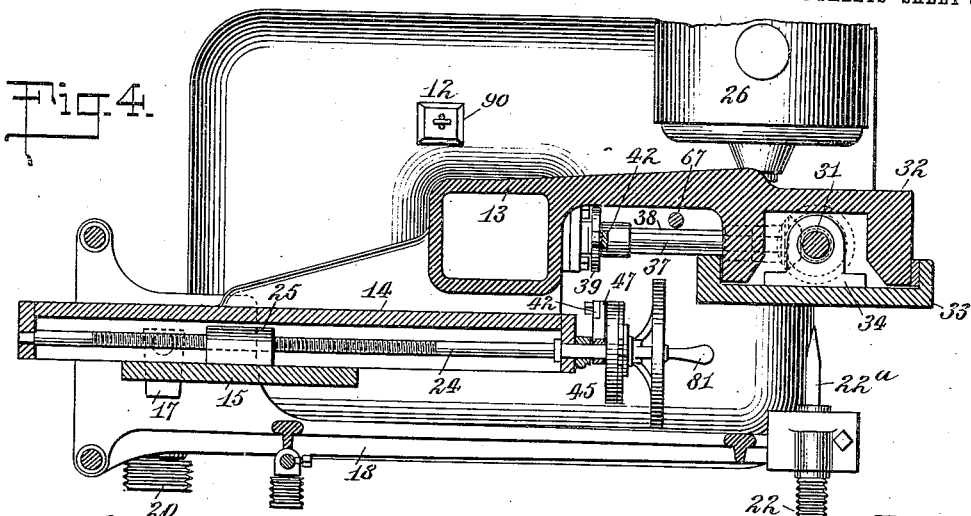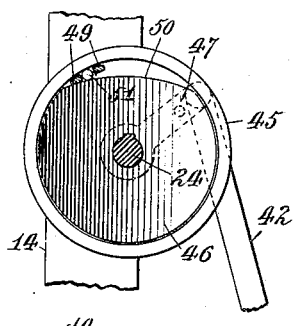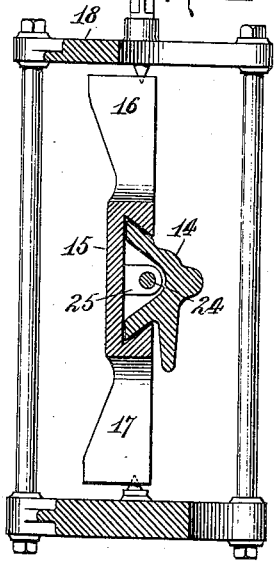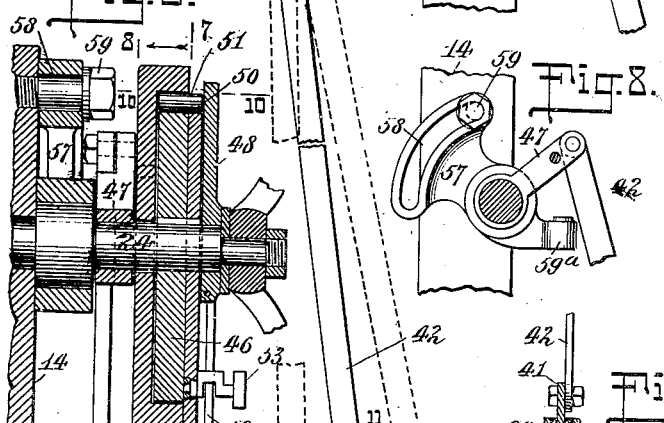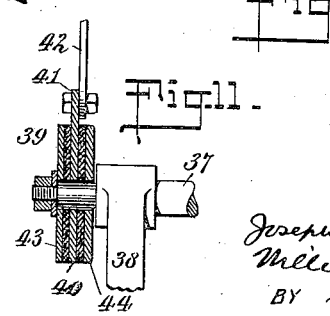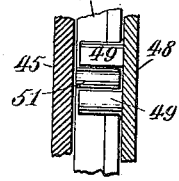

UNITED STATES PATENT OFFICE.

JOSEPH F. KELLER AND WILLIAM A. WARMAN, OF NEW YORK, N. Y., ASSIGNORS TO KELLER MECHANICAL ENGRAVING COMPANY, OF NEW YORK, N. Y., A CORPORATION OF NEW YORK.

MACHINE FOR ENGRAVING OR SINKING DIES.

956,769.  Specification of Letters Patent.  Patented May 3, 1910.

Application filed August 7, 1909. Serial No. 511,700.

*To all whom it may concern:*

Be it known that we, JOSEPH F. KELLER and WILLIAM A. WARMAN, citizens of the United States, and residents of New York, borough of Manhattan, county of New York, and State of New York, have made and invented certain new and useful Improvements in Machines for Engraving or Sinking Dies, of which the following is a specification.

Our invention relates to an improvement in machines for engraving or sinking dies, or re-producing in cameo or intaglio, and more particularly to a device of this character to be especially employed in re-producing a die from a templet, model or pattern, and of the same size, dimension or contour.

A further object of our invention is to provide a machine of this character which shall be simple in construction, economical to build, and which will operate with precision to quickly and readily re-produce the die from the pattern, and with this and other ends in view, consists in certain novel features of construction and combinations of parts, as will be hereinafter fully described and specifically pointed out in the claims.

In the accompanying drawings, Figure 1 is a view in front elevation of a machine constructed in accordance with our invention. Fig. 2 is a view in elevation looking at one side of the machine, and Fig. 3, a similar view looking at the opposite side of the machine. Fig. 4 is a sectional view taken on the line 4—4 of Fig. 1. Fig. 5 is a sectional view taken on the line 5—5 of Fig. 1. Fig. 6 is a detached view showing a part of the clutch mechanism. Fig. 7 is a view taken on the line 7—7 of Fig. 9. Fig. 8 is a view taken on the line 8—8 of Fig. 9. Fig. 9 is a sectional view of the clutch mechanism. Fig. 10 is a view taken on the line 10—10 of Fig. 9. Fig. 11 is a sectional view taken on the line 11—11 of Fig. 6.

Referring to the drawings, 12 represents the base of the machine having formed on or secured thereto the standard or post 13, the upper end of which is provided with the frame 14, said frame, post and base being preferably cast in one piece. The frame 14, shown in cross section in Fig. 5, has mounted thereon the plate 15, the rear side of which is dove-tailed or undercut, in order to prevent disengagement from the frame 14 upon which it is mounted. This plate or slide 15 has formed on or secured thereto, the vertical supporting arms 16, 17, on the extreme ends of which is pivotally mounted the swinging frame or bracket 18, near one end of the latter, this construction of parts permitting the plate or slide 15 to travel on the supporting frame 14 and carry with it the frame 18, the latter at the same time being permitted a swinging movement by reason of its pivotal connection with the outer ends of the arms 16, 17. This swinging frame 18 has mounted thereon the motor 19, the same being preferably located in a line with the axis of the supporting arms 16, 17, said motor being provided with a pulley 20 around which passes a belt or rope 21 to a pulley 22 for driving the cutting tool mounted on the forward end of said swinging frame, as hereinafter described.

On the forward end of the swinging frame 18 are mounted the tracing tool 23 and the cutting tool 22$^a$, located in a vertical line and equidistant from the axis of the supporting arms 16, 17, said cutter 22$^a$ and tracer 23 being permitted of an oscillating or swinging movement in a horizontal direction in accordance with the movement of the swinging frame upon which they are mounted, and in a direction toward and away from the pattern and work.

In the frame 14 is mounted the screw 24, on which is threaded the nut 25 secured to or formed on the rear side of the plate or slide 15, the result being that when said screw 24 is turned or rotated, the plate 15 and its supported frame 18 will be moved horizontally and in a direction in accordance with the direction in which said screw is rotated. By thus moving the frame 18, the tracer and cutter carried on the forward ends thereof, will be moved in a horizontal direction and across the faces of the pattern and work.

The base 12 of the machine has formed thereon or secured thereto the bracket 25$^a$, upon which is mounted a motor 26, said motor being provided with the gear 27 meshing with the gear 28 secured to the lower end of the shaft 29, to which is secured by means of the coupling 30, the screw 31, said screw 31 being mounted in the frame 32 formed on or secured to or cast integral with the standard 13.

On the frame 32 slides the plate 33, which plate on its rear side, is provided with the nut 34, threaded on the shaft 31, as clearly illustrated in Fig. 4 of the drawings.

From the foregoing it will be understood that when the shaft 29 and screw 31 are rotated in one direction by means of the motor 26, the plate 33 will be caused to travel in a vertical direction, either upwardly or downwardly in accordance with the direction of rotation of the motor.

On the plate 33 is clamped or otherwise secured, the model, templet or pattern 35, and in a vertical line therewith, the work 36, the model 35 and work 36 being located opposite to the tracer and cutting tool, respectively. To the shaft 29 is geared one end of the shaft 37, mounted in the bracket 38 secured to the standard 13, the opposite end of said shaft 37 being provided with the frictional disk drive 39, the details of which are clearly shown in Fig. 11. This drive preferably consists of the metal disk 40, provided with the arm or lug 41 to which is attached the connecting rod 42, hereinafter referred to. This metal disk 40 is loosely mounted on the shaft 37 between the leather-lined disks 43, 44, said disks 43, 44, being tightly secured to the shaft 37 and binding or impinging against the opposite two faces of said metal disk 40 with sufficient tension to cause the rotation of said disk 40 therewith, and with the shaft 37, until the same is held stationary by the devices hereinafter referred to.

On the shaft 24 is mounted a box or casing, in which is contained a cam 46, keyed to said shaft 24, and on which shaft is also loosely mounted the crank arm 47, the latter in turn being pinned or keyed to the casing 45, and having its outer end attached to the connecting rod 42. On the shaft 24 is mounted the plate 48, provided with the lugs 49 extending into the box or casing 45, and between the cam face 50 and the inner side or surface of the circular box or casing. Between the lugs 49 is contained a roller 51, and resting on the periphery 50 of the cam 46 and adapted as hereinafter described, to so bind said cam and box together as to cause the cam, box and shaft to travel together at predetermined times.

To the plate 48 are secured the spring arms 52, the lower free ends of which are adjustably secured to the box or casing 45 by means of the pin 53 passing between said spring arms and bearing thereon and into the holes or openings 54, 55 and 56, whereby to hold the plate 48 in its several relative positions with relation to the box 45 and cam 46.

It will be understood that when the plate 48 is secured in position, as illustrated in Fig. 6, that is, in a vertical position and wherein the lugs 49 will retain the roller 51 at about the central portion of the periphery of the cam 50, the box or casing 45 and cam 46 may be rotated or partially rotated without any binding action between the cam 46 and box 45. If, however, the plate 48 be shifted to one side or the other of the center, by inserting the pin 55 in the opening 54 or 56 of the casing, the roller 51 will be carried over to near one end of the eccentric cam face 50; if now the disk 40 be rotated until the arm or lug 41 is carried to its uppermost position, and the connecting rod 42 raised, the roller 51 will slightly travel on the cam face 50, until it binds between the casing 45 and cam 46, thereby causing the casing 45, cam 46 and shaft 24 to be slightly rotated, this rotation or partial rotation of the shaft 24 causing the plate 15, swinging frame 18, and the tracer and cutting tool to be fed or advanced in a horizontal direction. The disk 40 rotates until the connecting rod 42 occupies the position as illustrated say for instance as shown by the dotted lines in Fig. 6, to the right of the center of the disk 40. The parts remain in this position until after the motor is reversed, whereupon the disk 40 will rotate in the opposite direction, carrying the connecting rod into the position as shown in full lines, Fig. 6, and in dotted lines to the left of the center, in which position the parts will remain until the motor is again reversed. After each reversal of the motor, the shaft 24 is partially rotated or turned, and the tracing and cutting tool advanced or fed across the faces of the pattern and work. In order to limit or regulate the extent to which said shaft 24 is rotated at each stroke of the connecting rod 42, I secure to the slide 14 the link 57 provided with the arc-shaped slot 58, the bolt 59 passing through said slot and into said frame or slide 14, holding said link in its different positions. This link is loosely mounted on the shaft 24, and is provided with the stop 59$^a$ in vertical line with the crank arm 47, whereby when the connecting rod 42 is lowered, its downward movement will be limited by the arm 47 striking the stop 59$^a$, its upward movement, of course, being regulated by the length of the arm 41 formed on the disk 40. This reversing mechanism may be of any approved type, that which I have used with good results comprising a bracket 60 formed on or secured to the standard 13. On this arm or bracket 60 is pivoted the switch lever 61, one end thereof having secured thereto the knife 62 adapted to alternately contact with the terminals 63, 64 of the double-throw knife switch 65, the opposite end of the lever 61 contacting with the spring actuated stop 66 mounted on the bracket 60, in order to limit the throw and hold in its different positions the said lever 61. To the lever 61 is secured the lower end of the rod 67, the upper end of which is threaded and provided with the adjustable stops or collars 68, 69, as clearly shown in Fig. 3 of the drawings. To the frame 33 is secured the arm 70, through an opening in which passes the rod 67, said arm when the frame 33 is caused to travel upwardly, striking the stop 68, and when caused to travel downwardly, striking the stop 69, said stops being so adjusted as to limit the vertical travel of the frame and operate to reverse the motor, as hereinafter described. When the screw 31 is rotated in one direction, whereby the plate 33 is caused to travel downwardly, the arm 70 on said frame 33 will strike the lower stop 69, the result being that the rod 67 will throw the lever 61 into the position as illustrated in Fig. 1, that is, with the knife 62 contacting with the lower terminal 64 of the switch 65. Thereupon the direction of rotation is reversed, the screw 31 being then turned or rotated in the opposite direction, causing the plate 33 to travel upwardly until the arm 70 comes in contact with the upper stop 68, the result being that the rod 67 is raised, it in turn raising one end of the lever 61 and the knife 62 into contact with the upper terminal 63. The direction of rotation of the motor 26 is again reversed, this vertical reciprocating movement of the plate 33 being continued so long as the machine is in operation. The free end of the lever 61 is held in its raised and lowered adjustments by means of the spring-actuated stops 66, with which said lever contacts or engages, as illustrated in Fig. 1.

As illustrated in the several figures of the drawings, the screws 24 and 31 may be provided with handles 80, 81, whereby to turn the same when the pattern and work are being adjusted in their proper relative positions in the machine.

From the foregoing it will be understood that when the machine is in operation, there is a continuous vertical reciprocating movement of the plate 33 carrying the model or pattern 35 and work 36, with which contact respectively, the tracer 23 and cutting tool 22ª. In order to retain said tracer and cutting tool in contact with the model and work, we employ a weight 90, attached to one end of a rope or wire 91, passing over a pulley 92 mounted on a bracket 93 formed on or secured to the plate 15, the opposite end of said rope or wire being secured to the swinging frame 18. While the pattern 35 and work 36 are thus vertically reciprocating in front of the tracing and cutting tools, the latter are, as before described, given a horizontal movement across the faces of said pattern and work, by reason of the travel of the plate 15 on the screw 24, and which plate as before described, carries the swinging frame 18; that is, at the time that the plate 33 arrives at its uppermost point, the feeding mechanism partially turns the screw 24, thereby causing the plate 15 and its attached frame 18, with the tracer and cutting tools, to move in a horizontal direction; the direction of rotation of the motor 26 is then reversed, and the plate 33 carrying the model and work is caused to travel downwardly. When the plate 33 reaches its lowest point, the feeding mechanism again causes the screw 24 to partially rotate, thereby causing the tracer and cutting tool to be again moved in a horizontal direction across the face of the model and work, respectively. The plate 33 again travels upwardly to its uppermost point, and this operation continues until the tracer and cutting tool have been fed entirely across the faces of the model and work and the die or work under operation completed.

This machine we have found in practice to be very effective in its operations, re-producing as it does, with great precision and nicety, a die or other work from a model, templet or pattern. It is automatic in its operations and comparatively simple and cheap to construct.

Having fully described our invention, what we claim as new and desire to secure by Letters Patent, is:—

1. In a machine of the character described, the combination with a vertically reciprocating plate, of the model and work secured to said plate, a horizontally swinging frame, a tracer carried by said frame in contact with said model, a rotating cutting tool carried by said frame in contact with said work, and means for moving said frame horizontally whereby to feed said tracer and cutting tool horizontally across the faces of said pattern and work, substantially as described.

2. In a machine of the character described, the combination with a vertically reciprocating plate, of the model and work secured to said plate, a reversing motor indirectly connected with and operating said plate, a horizontally sliding plate, a horizontally swinging frame pivoted to said sliding plate, a tracing tool carried by said swinging frame, a rotating cutting tool carried by said frame, means for holding said tracing and cutting tools in contact with the model and work, respectively, and means for feeding said plate and frame in a horizontal direction whereby to move said tracer and cutting tool across the faces of the model and work respectively, substantially as described.

3. In a machine of the character described, the combination with a vertically reciprocating plate, of a reversing motor indirectly secured thereto for operating said plate, the model and work secured to said plate, a horizontally sliding plate, means for feeding said sliding plate in a horizontal direction, a horizontally swinging frame pivoted to said sliding plate, a tracer carried by said frame and held in contact with said model, a cutting tool carried by said frame in contact with said work, and means moving with said frame and connected with said cutting tool for rotating the latter, substantially as described.

4. In a machine of the character described, the combination with a vertically reciprocating plate, of a motor connected with and operating said plate, an automatic switch connected with said motor and engaging with said plate for reversing said motor and limiting the travel of said plate, the model and work connected with said plate, a sliding plate mounted on the frame of the machine, a horizontally swinging frame pivoted to said sliding plate, a tracer carried by said swinging frame, a cutting tool carried by said swinging frame, means for retaining said tracer and cutting tool in contact with the model and work respectively, a motor mounted on said frame and connected with said cutting tool for rotating the latter, and feeding mechanism connected with said sliding plate, and with the first-mentioned motor for automatically feeding said sliding plate and parts connected therewith in a horizontal direction, whereby said tracer and cutting tool are fed across the faces of said pattern and work respectively, substantially as described.

5. The combination with a screw, of a casing loosely mounted on said screw, a crank arm loosely mounted on said screw and secured to said casing, a cam fitting in said casing and tightly secured to said screw, an adjustable roller located between said cam and said casing, a stop for limiting the movement of said crank arm, and a friction drive connected to said crank arm, substantially as described.

6. The combination with a screw, of a casing loosely mounted on said screw, a crank arm loosely mounted on said screw and pinned to said casing, an adjustable stop for limiting the movement of said crank arm, a cam tightly secured to said screw and fitting within said casing, a roller located between said cam and casing, means for adjusting the position of said roller, a driving shaft, a friction drive mounted on said shaft, and a connecting rod connecting said friction drive with said crank arm, substantially as described.

Signed at New York, borough of Manhattan, county of New York and State of New York, this 31st day of July, 1909.

JOSEPH F. KELLER.
WILLIAM A. WARMAN.

Witnesses:
M. VAN NORTWICK,
WILLIAM R. EDSON.